3,024,058
APPARATUS FOR ENGAGING AND MOVING ELONGATED TUBULAR OBJECTS SUCH AS PIPE AND THE LIKE OF VARYING LENGTHS AND DIAMETERS
Stuart W. Sinclair, Houston, Tex., assignor to Leo D. Reel, Houston, Tex.
Filed June 9, 1958, Ser. No. 740,686
9 Claims. (Cl. 294—67)

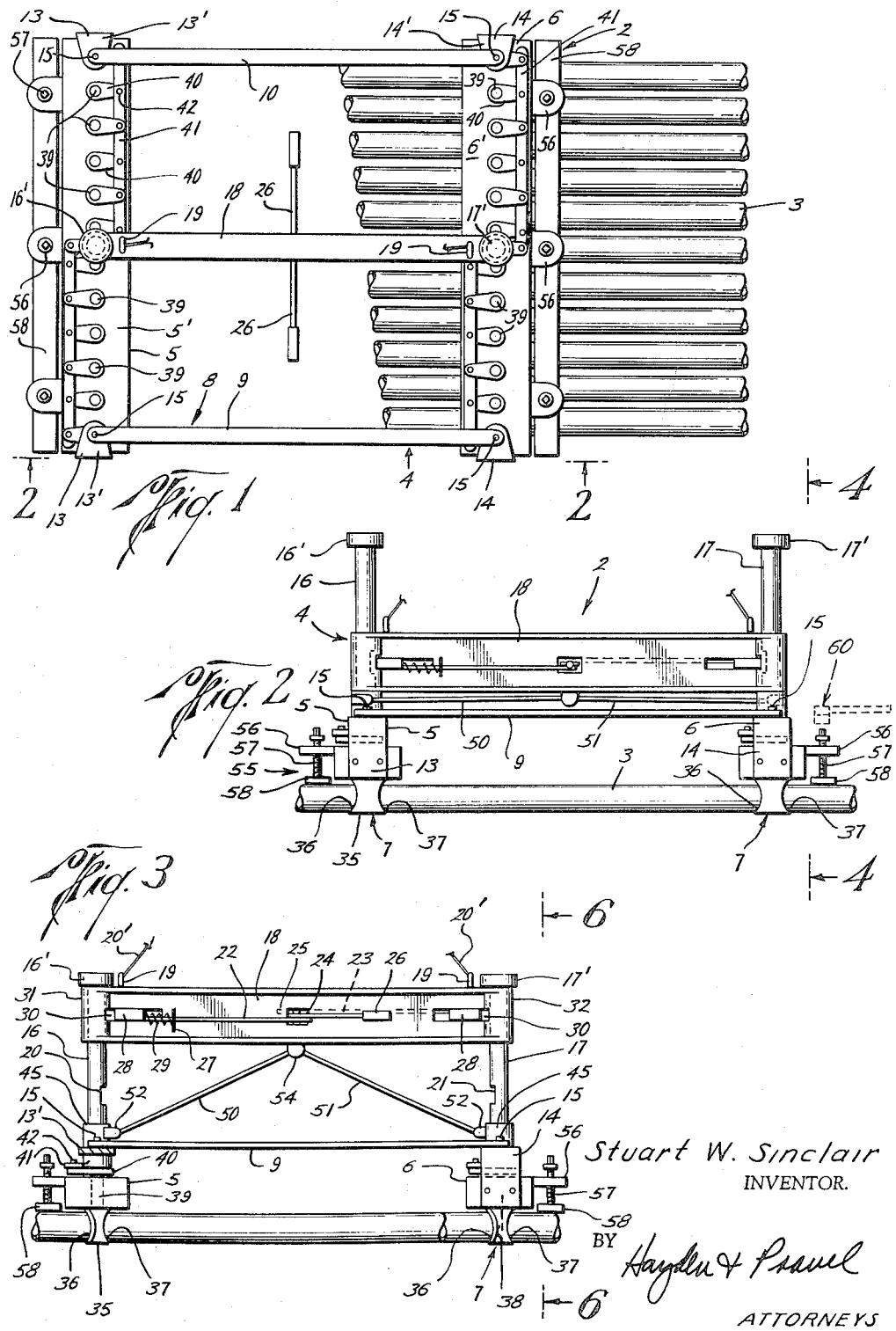

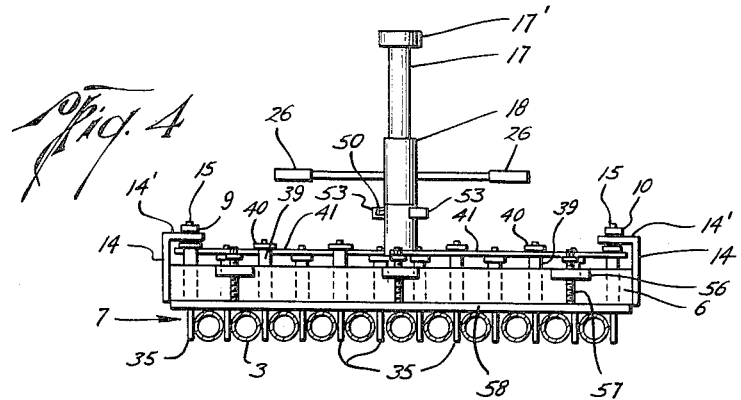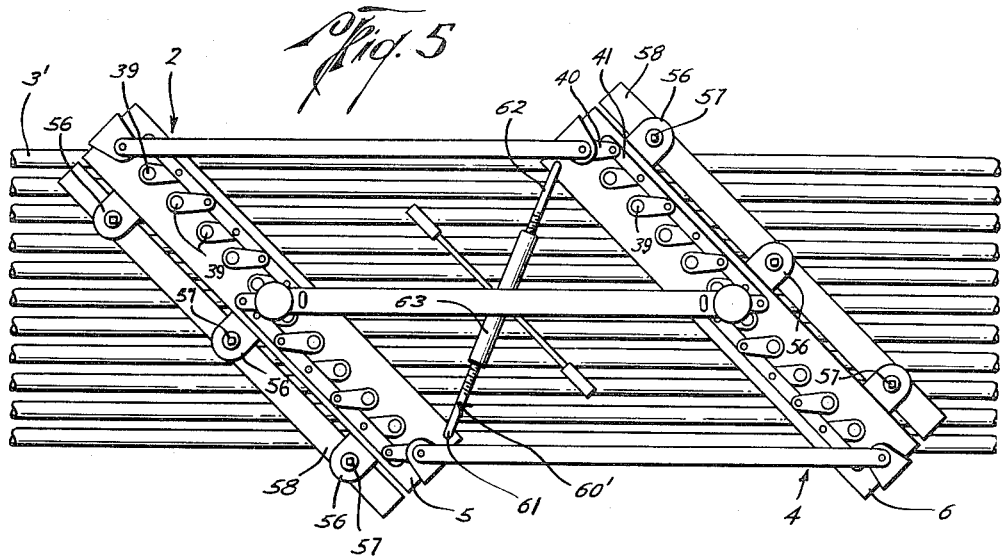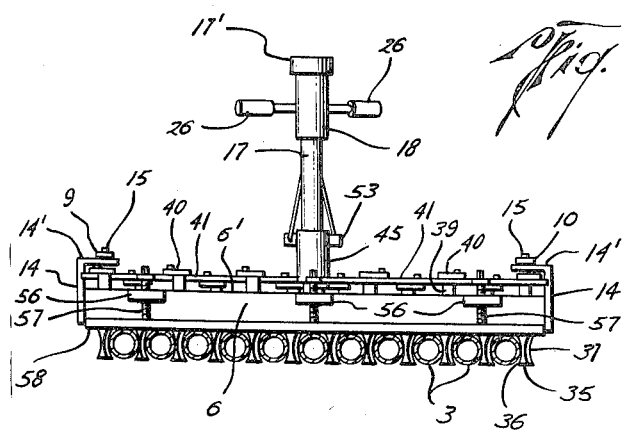
Stuart W. Sinclair
INVENTOR.

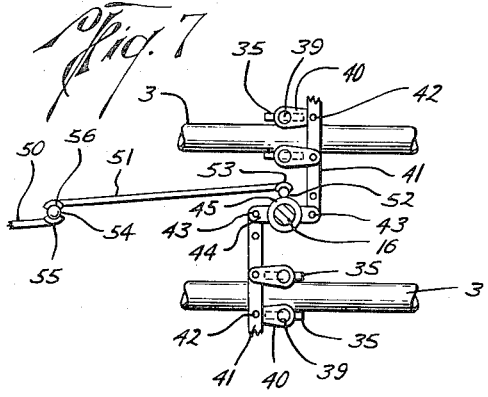
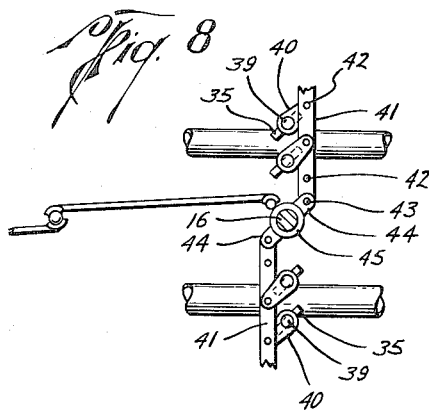
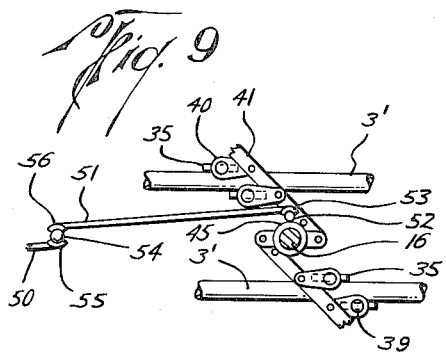
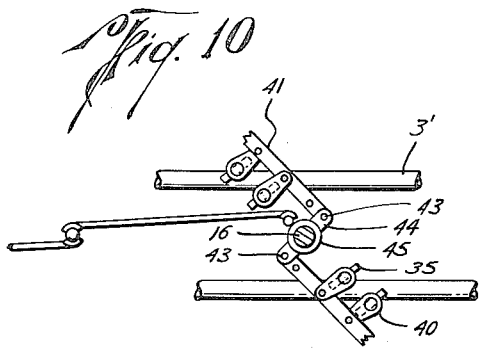
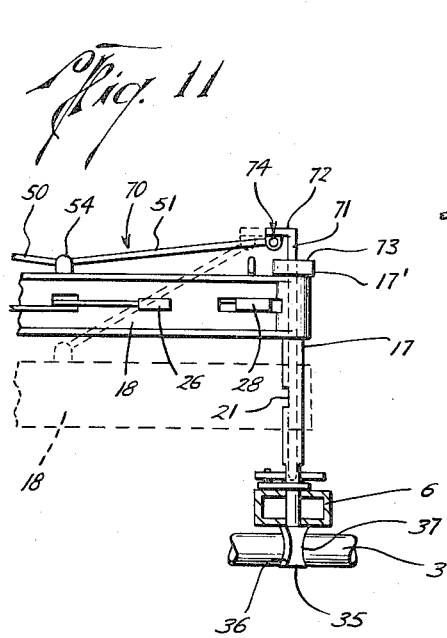
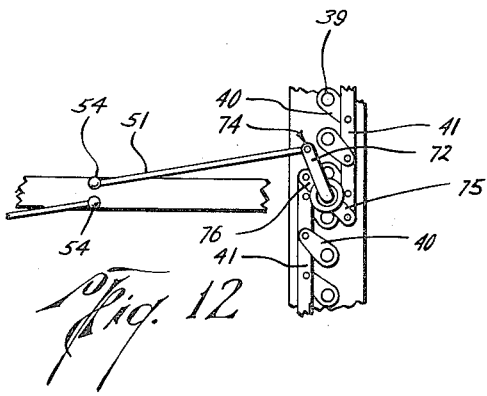
Stuart W. Sinclair
INVENTOR.

The present invention relates to a device for engaging tubular objects such as pipe and the like of varying diameter and length whereby a plurality of pipe may be moved at one time.

In lifting and moving tubular objects from one location to another, it is desirable to move as many pipes at one time as possible. This decreases the time and cost required for loading pipe onto or discharging pipe from vehicles such as trucks and the like, or trains or sea-going vessels. Also, it may be desirable to move pipe from one location to another at a storage depot, in which event it is desirable to move the pipe as rapidly and as efficiently as possible.

Generally, it is not uncommon to have pipe of more than one length, and of various diameters on hand. Therefore, if the device is capable of handling only a predetermined size of pipe, or tubular objects, its usefulness is greatly impaired.

The present invention provides a device for handling a plurality of elongated tubular objects such as pipe or the like, and for moving them about as desired.

Another object of the present invention is to provide a device for engaging a plurality of elongated tubular objects such as pipe and the like, whereby pipe may be simultaneously moved, such device including means whereby it may be quickly and easily adjusted for accommodating pipe of different diameter.

Still a further object of the present invention is to provide a loading device wherein a frame is provided with a plurality of pipe engaging means, which pipe engaging means is adapted to be rotated about its vertical axis whereby it can engage a plurality of pipe for moving the pipe simultaneously.

Still a further object of the present invention is to provide a device for engaging and lifting simultaneously, a plurality of elongated tubular objects such as pipe and the like, including a frame, means for supporting the frame in predetermined relation to the elongated tubular objects to be engaged by the device, a plurality of pipe engaging means carried by the frame, means for retaining the pipe engaging means in inactivated position, but which means is releasable whereby the pipe engaging members may be moved to pipe engaging relation, and additional means for rotating said pipe engaging means about their vertical axis to simultaneously engage and hold a plurality of pipe in the device.

Still a further object of the present invention is to provide a frame including a plurality of pipe engaging means, which frame may be readily and easily adjusted for receiving a plurality of elongated tubular objects such as pipe and the like of varying diameter whereby such pipe may be engaged and retained in position in the device by the pipe engaging means.

Other objects and advantages of the present invention will become more readily apparent from a consideration of the following description and drawings wherein:

FIG. 1 is a top plan view of the present invention showing it positioned on a plurality of tubular objects such as pipe, the pipe being broken in order to more clearly illustrate the structural arrangement of the present invention;

FIG. 2 is a side view on the line 2—2 of FIG. 1, showing the device illustrated in FIG. 1 in position on a plurality of elongated objects such as pipe, and with the pipe engaging means in non-engaging relation relative to the pipe;

FIG. 3 is a view similar to FIG. 2, but shows the relationship of the components of the present invention when the pipe engaging means have been actuated to engage the plurality of pipe within the frame;

FIG. 4 is a view on the line 4—4 of FIG. 2 illustrating the arrangement of the tubular objects relative to the pipe engaging means, while the pipe engaging means are in deactivated position;

FIG. 5 is a plan view similar to FIG. 1, but showing the frame of FIG. 1 adjusted for receiving a plurality of tubular objects such as pipe and the like of smaller diameter;

FIG. 6 is a view on the line 6—6 of FIG. 3 to more clearly illustrate the relationship of the pipe engaging means to the pipe when the pipe engaging means have been activated;

FIG. 7 is a schematic view illustrating a portion of the pipe engaging means and the means for activating the pipe engaging means and their relationship to each other and to the pipe when in deactivated position;

FIG. 8 is a schematic view similar to FIG. 7, but showing the relationship of the means for activating the pipe engaging means to the pipe engaging means when the pipe engaging means is rotated about its vertical axis to pipe engaging relation;

FIG. 9 is a schematic view representing a portion of the pipe engaging means and the means for activating the pipe engaging means and their relationship to each other when the frame has been adjusted to accommodate pipe of smaller diameter, but with the pipe engaging means in inactivated position;

FIG. 10 is a schematic view similar to FIG. 9, but showing the pipe engaging means of FIG. 9 rotated about their vertical axis to pipe engaging relation;

FIG. 11 is a partial elevation, showing an alternate embodiment of the means for effecting movement of the pipe engaging means; and FIG. 12 is a partial plan view of the modification shown in FIG. 11 to more clearly illustrate the structural arrangement of the modified form of the invention.

In FIGS. 1 and 2 of the drawings, the present invention is referred to generally by the numeral 2 and is shown resting on a plurality of elongated objects such as pipe 3, which are to be engaged by the invention and simultaneously moved.

The device includes a frame generally indicated at 4 which comprises paired horizontally disposed members 5 and 6. The members 5 and 6 may be constructed in any suitable manner to provide sufficient support for the pipe to be engaged and lifted by the frame. Pipe engaging means designated at 7 are carried in each of the horizontally disposed members 5 and 6, whereby the pipe 3 may be supported in position on the frame members 5 and 6.

Means indicated at 8 are provided for maintaining the horizontally disposed members 5 and 6 in spaced relation to each other so that the tubular or elongated objects such as pipe and the like which are to be engaged by the device will be contacted at two separate spaced locations between their ends. The means 8 which connect the horizontally disposed members 5 and 6 of the frame 4 together are shown in the drawings as comprising the tie rods 9 and 10, which extend along each side of the frame 4 as shown in FIG. 1 of the drawings. Each tie rod 9 and 10 is pivotally secured or connected with the horizontally disposed members 5 and 6 by any suitable means such as shown in the drawings, wherein a bracket 13 is provided on each end of the member 5 and a bracket 14 is provided on each end of the member 6. Such bracket extends upwardly above the horizontally disposed members 5 and 6 and is provided with the portions 13' and 14' on each of the brackets 13 and 14 respectively, which extend laterally inwardly of each of the members 5 and 6, and is spaced from but parallel to the top surface 5' and 6' of each member 5 and 6. Pivot pins 15 extend through the ends of each of the tie rods 9 and 10, and through the portions 13' and 14' on each of the brackets 14 and 15 to pivotally connect the tie rods 9 and 10 between the members 5 and 6. Thus, the members 5 and 6 are maintained in spaced relation by the tie rods 9 and 10, and are maintained in parallel spaced relation regardless of their alignment relative to the elongated tubular objects or pipes which are to be engaged by the device.

As previously mentioned, any suitable form of means for maintaining the members 5 and 6 in such relationship may be provided without departing from the scope of the present invention.

The frame 4 also includes the vertically extending members 16 and 17 which are mounted on each of the members 5 and 6 respectively and extend upwardly therefrom as shown in FIGS. 2 and 3 of the drawings. Each of the members 16 and 17 is provided with an enlarged end 16' and 17' at their upper end respectively, which serve as a stop means for the member 18 which is movable or slidable along each of the members 16 and 17. An eye 19 is provided at each side of the member 18 to provide a means for connecting the lifting cable 20' to the device.

The lifting cable 20' is in turn connected by any suitable means well known in the art to a hoisting cable of a power mechanism such as a crane and the like, whereby the frame 4 may be lifted as will be more fully described hereinafter.

In order to retain the member 18 in non-movable or non-slidable relationship relative to the vertically extending members 16 and 17, suitable means are provided which include the recesses 20 and 21 on each of the members 16 and 17 at the lower end thereof. Rods 22 and 23 are pivotally connected at one of their ends as illustrated by the numeral 24 and 25 respectively, to the handle 26 which extends laterally through and is rotatably supported in the member 18 as shown in FIG. 1 of the drawings. The rods 22 and 23 each extend through a bracket 27 mounted on the side of the member 18 and are each provided with an enlarged end as illustrated at 28. A spring 29 abuts the bracket 27 and the enlarged end 28 tending to urge the enlarged end 28 of each rod through the opening 30 in each end 31 and 32 of the member 18, which is carried by the vertically extending members 16 and 17 respectively.

Therefore, when the member 18 is in its lowermost position on the frame 4 as represented in FIG. 2 of the drawings, the enlarged end 28 of each of the rods 22 and 23 will be urged outwardly of the openings 30 to seat in the recesses 20 and 21 of the members 16 and 17 respectively. This locks the member 18 against movement relative to the members 16 and 17, and locks the pipe engaging means 7 against release.

As shown in the drawings, the pipe engaging means 7 is in the form of a plurality of plate members 35, each of which plate members is provided with an arcuate side or edge portion 36 and 37 so that when the members are rotated about their vertical axis represented by the dotted line at 38 in FIG. 3, the arcuate edge surfaces 36 and 37 engage adjacent peripheries of the elongated tubular objects such as pipe and the like for holding the pipe in the device 2. The members 35 include an integral, upwardly extending stem 39 whereby the members 35 may be rotatably supported in each of the members 5 and 6 of the frame 4. The rotatable support for the stems 39 is not shown in detail in that any suitable form of bearing means, either sleeve or ball or roller bearings may be provided, whereby the stems 39 may be supported in each of the frame members 5 and 6 to rotate about its vertical axis 38 and relative to the members 5 and 6. It will be noted that the members 35 are laterally spaced on each of the members 5 and 6 and that the stems 39 are aligned along the longitudinal axis of each of the members 5 and 6 as more clearly illustrated in FIGS. 1 and 5 of the drawings. Any suitable number of members 35 may be provided depending upon the size and number of pipe adapted to be engaged by the device of the present invention. The upper end of the stems 39 project above the top surfaces 5' and 6' of each of the members 5 and 6.

Secured to the upper end of each of the stems 39 is the cam 40, which extend parallel to each other and in the same direction on one side of the frame 4, and parallel to each other, but in an opposed direction on the other side of the frame member 4, as more clearly illustrated in FIGS. 1 and 5. A lever 41 is pivotally connected as illustrated at 42 to each of the ends of each of the cams 40, which lever extends substantially parallel to and along the top surface 5' and 6' of each of the members 5 and 6. As shown in FIGS. 1 and 5, there is a lever 41 on each side of each of the members 5 and 6 of the frame 4, thereby making a total of four levers 41 for simultaneously actuating all of the pipe engaging members 35.

As more clearly illustrated in FIG. 7, the levers 41 are pivotally connected at their inner end as illustrated at 43 to the projections 44, which extend diametrically from each of the collars 45, therebeing one collar rotatably, but non-longitudinally movably mounted adjacent the lower end of each of the vertically extending members 16 and 17, as shown in the drawings. Any suitable means may be provided for accommodating relative rotative rotation between the collars 45 and the members 16 and 17, upon which the two collars are mounted, such as, for example, a roller may be mounted on the inner periphery of each of the collars 45 which is adapted to engage an annular recess on each of the members 16 and 17. This would accommodate rotational movement of the collars 45 on the members 16 and 17, while inhibiting longitudinal movement thereof.

When the collars 45 are each rotated, the levers 41 connected to the projections 44 on the collars are also moved. Movement of the levers 41 turns the cams 40 which causes the stems 39 and connected plates 35 to rotate about their vertical axis 38.

Rods 50 and 51 interconnect each of the collars 45 on the members 16 and 17 with the member 18 as shown in FIGS. 2 and 3 of the drawings. The form of connection of the rods 50 and 51 on the collars 45 and the member 18 is schematically illustrated in FIG. 7 of the drawings, wherein a ball 52 is illustrated as being provided on each of the collars 45, which ball is adapted to engage with the socket 53 on the ends of each of the rods 50 and 51 in a well known manner.

A ball 54 is mounted on the member 18 and is adapted to be engaged with the sockets 55 and 56 on the other ends of each of the members 50 and 51. Such ball and socket construction is well known in the art and it is believed unnecessary to give a detailed description thereof, other than the schematic representation for purposes of description of its function in connection with the present invention. The ball 52 on each collar 45 and socket 53 on each rod 50 and 51, as well as the ball 54 on member 18 and sockets 55 and 56 on rods 50 and 51 respectively, permit free movement of the sockets about the ball so that as the member 18 is moved, the rigid rods 50 and 51 effect rotation of each of the collars 45 about the vertically extending members 16 and 17 so as to actuate the pipe engaging means 7.

More particularly, the collars 45, the rods 50 and 51, as well as the interconnection of such rods with the member 18 and the collars 45 comprises a means to rotate the pipe engaging members 7 simultaneously about their vertical axis 38 to urge the pipe engaging members 35 to pipe engaging relation. For example, the lateral spacing of the members 35 in each of the members 5 and 6 remains fixed, and when the frame 4 is lowered onto a row of tubular elongated objects such as the pipe 3, the members 35 will assume the relation scematically represented in FIG. 7. At this time, the members 35 are faced in a parallel relation to each other and perpendicularly aligned to the longitudinal axis of each of the members 5 and 6, whereby a pipe 3 may be received between adjacent members 35 as shown in FIG. 7 of the drawings. Also, when the frame 4 is lowered onto the row of pipe to be picked up, the member 18 is in the position represented in FIG. 2 of the drawings, wherein it is locked at the lowermost position on each of the vertically extending members 16 and 17 by reason of the locking means, including the rods 22 and 23 with their enlarged ends 28 engaged through the openings 30 into the recesses 20 and 21 of each of the members 16 and 17.

Thus, the member 18 is retained against longitudinal movement along the members 16 and 17 of the frame 4, and the pipe engaging means 7 comprising the pipe engaging elements or plates 35 are retained in inactivated or non-pipe engaging relation. When it is desired to engage the row of pipe, in order that it may be lifted, the handles 26 are manually grasped and moved in a horizontal plane whereupon each of the rods 22 and 23 are moved against the tension in spring 29, whereupon the enlarged ends 28 retract from the recesses 20 and 21 in each of members 16 and 17, so that when a strain is taken on the cable 20' by the lifting crane or other power mechanism, the member 18 will move upwardly along each of the members 16 and 17. As the member 18 moves upwardly, the rods 50 and 51 move from their initial position illustrated in FIG. 2 of the drawings, to the position shown in FIG. 3 of the drawings. Since the rods 50 and 51 are rigid, the distance between their sockets 55 and 56 on one end and the sockets 53 on their other end of each of the rods remains fixed, which causes the sockets 53 to pull ball 52 mounted on each collar 45 so as to rotate the collars 45 in order to maintain this fixed length of the rods 50 and 51.

As each of the collars 45 is rotated, the projections 44 thereon in turn cause the levers 41 to move longitudinally and parallel to the members 5 and 6. As the construction is represented in the drawings, upward movement of the member 18 extending between the vertically extending members 16 and 17 will cause the levers 41 in the top portion of the frame 4 as viewed in FIG. 1 to move towards the top of the page, while the levers 41 in the lower half of the frame will move towards the bottom of the page. This will cause all of the members 35 in each of the members 5 and 6 to rotate simultaneously and in the same direction so that their arcuate surfaces 36 and 37 engage the peripheries of adjacent pipe. The arcuate configuration of the members 35 retain the pipe engaged therewith and when the member 18 abuts the upper end 16' and 17' of the vertically extending member 16 and 17, further lifting will cause the pipe to move upwardly with the frame, whereupon the pipe 3 may be moved about as desired.

The relationship of the members 35 when they have been actuated to pipe engaging relation is more clearly illustrated in FIG. 8 of the drawings. It will be noted that the upper rod 41 has been illustrated as moving upwardly towards the top of the drawing, and the lower rod has been illustrated as moving downwardly towards the bottom of the page of drawings, and correspondingly all of the members 35 which are connected through their stems 39 and cams 40 and the pivotal connection 42 to the lever 41 are rotated simultaneously and in the same direction to pipe engaging position.

In order to initially position the frame 4 on the pipe 3, suitable means as illustrated generally at 55 are provided and are shown as comprising the projections 56 connected to each of the members 5 and 6 which is provided with the threaded shank 57 and the plate 58 on the lower end of the threaded shanks 57. If desired, suitable markings may be provided longitudinally of the threaded shanks 57 to indicate the position to which the shanks will have to be moved in order to accommodate pipe of varying size in the frame 4. Any suitable means may be used to rotate the threaded shanks 57 and as illustrated by dotted line at 60, a socket wrench may be used to accomplish such adjustment.

FIGS. 5, 9 and 10 represent the arrangement of the present invention for accommodating pipe of diameter which is different from the diameter of the pipe illustrated with regard to FIGS. 1, 2, 3, 7 and 8. More particularly, it can be seen from the drawings that the pipe 3' in FIG. 5 of the drawings is illustrated as being smaller in diameter. Since the lateral spacing of the members 35 within each of the members 5 and 6 is fixed, the lateral spacing between the members 35 can be effected only by changing the relationship of the members 5 and 6 to each other. The pivotal connection of the tie rods 9 and 10 accommodate movement of the members 5 and 6 to any of a plurality of positions, one of which is represented in FIG. 5, wherein it will be noted that the members have each been rotated or skewed laterally of the row of pipe 3'. Thus, when the members 5 and 6 are moved to this position, the lateral spacing between the members 35 is decreased as represented schematically in FIG. 9 of the drawings. At such time, the members 35 are still retained in inactivated position, or in pipe disengaged position, and are parallel to each other as shown in FIG. 9 of the drawings.

In order to retain the frame members 5 and 6 in skewed relationship, suitable means may be provided as illustrated generally at 60' which is shown as including the rods 61 and 62 pivotally connected at opposed ends of the members 5 and 6, which rods 61 and 62 are threadedly connected with the turnbuckle 63 whereby the members 5 and 6 may be moved to any angular or skewed relation and thereafter maintained in such relation by engaging the turnbuckle 63 with the threaded ends of the rods 61 and 62. This changes the lateral spacing between the members 35 in each of the members 5 and 6, without otherwise affecting the functioning of the device. In order to move the members 35 to pipe engaging position, the member 18 is released or unlocked for movement along each of the members 16 and 17 as previously described with regard to FIGS. 1, 2, 7 and 8. As the member 18 moves upwardly along each of the vertically extending members 16 and 17, the tie rods 50 and 51 effect rotation of the collars 45 around each of the members 16 and 17 so as to move the members 35 simultaneously about their longitudinal axis 38 to pipe engaging relation as illustrated in FIG. 10 of the drawings.

In FIGS. 11 and 12, an alternate form of the means for rotating the pipe engaging members is provided and is illustrated generally by the numeral 70. The means 70 includes an elongated member 71 which is rotatably supported in each of the vertically extending members 16 and 17. The member 71 terminates at its upper end 72 in spaced relation to the top 73 of the enlarged heads 16' and 17', whereby the ball and socket arrangement illustrated generally by the numeral 74 may be provided thereon for connecting the members 71 through the rod 51 to the member 18. The member 71 is provided at its lower end with diametrically opposed projections 75 and 76, which are pivotally connected to the lever 41 to rotate the cams 40 and connected stems 39 of pipe engaging plate members 35. In the FIG. 12 modification, the movement of the lever 41 will be in a reverse direction to that as described with regard to the FIGS. 7–10 modification, but the resulting function will be the same. The members 35 will be rotated about their longitudinal vertical axis, and they will be rotated simultaneously to pipe engaging position. The modification illustrated in FIGS.

11 and 12 can also be used on varying diameter pipe, by moving the frame members 5 and 6 to a skewed relationship relative to the row of pipe 3 to be picked up as previously described with regard to FIGS. 5, 9 and 10 of the drawings.

While it is believed that the operation of the present invention is apparent by reason of the foregoing description, to further amplify and describe, it will be assumed that the device 2 is ready to be lowered onto a row of elongated tubular objects such as pipe 3 as shown in FIGS. 1, 2 and 3 of the drawings. As the frame 4 is lowered to position immediately above the pipe 3, the support means 55 may be adjusted by means of the wrench as indicated by dotted line at 60 so that the members 5 and 6 will be supported horizontally properly to the pipe 3, to effect proper engagement of the members 35 with each of the pipes therebetween.

Also, as the frame 4 is lowered, the member 18 extending between each of the vertically extending members 16 and 17 is at its lowermost position as illustrated in FIG. 2 of the drawings, and is maintained in such position so as to lock the pipe engaging means 7 in inactivated position. After the frame 4 has been properly seated on the pipe and the pipe positioned between each of the members 35, the handle 26 on either side of the frame may be grasped and moved in a horizontal plane so that the enlarged ends of each of the rods 22 and 23 which extend along the member 18 and fit into the recesses 20 and 21 may be retracted. When the rods 22 and 23 are retracted, their enlarged ends 28 act against the spring 29 and move out of the recesses 20 and 21 in each of the members 16 and 17. Thus, when a lifting force is exerted on the cable 26', the member 18 will move upwardly along each of the members 16 and 17 from the position shown in FIG. 2 to the position shown in FIG. 3 of the drawings.

The initial position of the pipe engaging means 7, and more particularly the members 35 is schematically represented in FIG. 7 of the drawings, when the frame 4 is lowered onto the pipe. It will be noted that the members 35 are at this time in non-engaged position or relation with the pipe and are spaced laterally a proper distance to receive a pipe 3 between the spaced members 35, so that one pipe may be gripped on each side thereof, to firmly retain it in position as the frame 4 is lifted. This relation is schematically illustrated in FIG. 7, wherein four of the pipe engaging members 35 are illustrated, and two pipes 3 are illustrated, with one member 35 being on each side of the pipe 3.

As the member 18 is moved upwardly along the members 16 and 17, the collars 45, by reason of their connection with the member 18 through the rods 50 and 51 are rotated to in turn impart movement to the levers 41. The levers 41 are pivotally connected with each of the cams 40, which offset the lever 41 from the longitudinal axis 38 of the members 35, whereupon a turning effort is applied thereto. It will be noted that this effort is applied simultaneously to all of the members 35 and in the same direction so that they assume the relation as schematically represented in FIG. 8 of the drawings. After the pipe has been thus engaged, the frame 4 and engaged pipe may be lifted by the cable 20' and power mechanism and moved as desired.

If pipe of a smaller diameter is to be engaged by the device, the members 5 and 6 may be skewed or moved to the proper angular relation so as to space the members 35 laterally relative to each other the proper distance so as to engage the pipes therebetween when they are activated. In FIG. 5 the skewed relation of the members 5 and 6 is shown, and as previously described, they may be retained in such position by means of the turnbuckle 63 engaged with the threaded rod 61 and 62 connecting between the frame members 5 and 6 as illustrated by FIG. 5 of the drawings.

FIG. 9 illustrates schematically the relationship of the members 35 when the members 5 and 6 are thus skewed, in order to decrease the lateral spacing between the members 35, whereby smaller diameter pipe as represented at 3' may be engaged by the device. The functioning of the device, when it is to be used to engage smaller diameter pipe is the same as that previously described in that when the member 18 moves upwardly relative to the vertically extending members 16 and 17, the rods 50 and 51 transmit such movement to the collar 45, whereupon the collar 45 rotates about each of the members 16 and 17 to thereby effect movement of the levers 41 and subsequent rotation of each of the pipe engaging plate members 35, such rotation being effected simultaneously. The mechanism then assumes the position as schematically illustrated in FIG. 10 of the drawings, and again the device 2 and load of pipe 3' may be moved about by a hoisting mechanism as desired.

When the modification illustrated in FIGS. 11 and 12 is used, the rods 50 and 51 are connected to the top of the member 18 and rotational movement is imparted to the longitudinally extending member 71, which is supported within each of the vertically extending members 16 and 17. The rotation of members 71 is effected in a manner as previously described with regard to collars 45. The members 71 being provided with opposed projections 75 and 76 which are similar to the projections 44 on the collar 45, cause the lever 41, which is pivotally connected with such projections, to move when the member 71 is rotated.

It will be noted that the spacing of the members 5 and 6 enables the pipe to be engaged at spaced locations to aid in steadying the pipe as it is lifted off the ground and moved about by the hoisting mechanism.

Broadly the present invention relates to a pipe loading device, and more particularly to a pipe loading device for simultaneously engaging a plurality of pipe for moving the pipe about as desired, which device contemplates a mechanism which may be relatively easily adjusted for receiving pipe of varying diameter.

What is claimed is:

1. A device for lifting a plurality of pipe including a frame, said frame including paired horizontally disposed members, means interconnecting said paired members to maintain them in parallel spaced relation, a vertically extending member mounted on each of said horizontally disposed members, means extending between and slidably supported on said vertically extending members whereby said frame may be lifted, a plurality of pipe engaging members rotatably supported in each of said horizontally disposed members and depending downwardly therefrom, means interconnecting said pipe engaging members for turning said pipe engaging members simultaneously about their vertical axis to pipe engaging position, and a connection between said means slidably supported by said vertically extending members and said interconnection whereby movement of said means on said vertically extending members is transmitted to said interconnection to rotate said pipe engaging means to active position, said interconnecting means between said horizontally disposed members being pivotally mounted on each of said members to accommodate skewing of said horizontally disposed members to change the lateral spacing between said pipe engaging means, and means connecting said paired horizontally disposed members to maintain any desired skewed relationship of said horizontally disposed members.

2. The combination recited in claim 1 including means locking said slidable means on each of said vertically extending members to retain said pipe engaging members in non-rotated, non-pipe engaging relation.

3. The combination recited in claim 1 including means locking said slidable means on each of said vertically extending members to retain said pipe engaging members in non-rotated, non-pipe engaging relation, and additional means to release said locking means whereby said slidable means is free to move along said vertically extending members when said frame is lifted to thereby turn said pipe engaging means about their axis to pipe engaging relation.

4. A device for lifting a plurality of pipe including a frame, said frame including paired horizontally disposed members, means interconnecting said paired members to maintain them in parallel spaced relation, a vertically extending member mounted on each of said horizontally disposed members, means extending between and slidably supported on said vertically extending members whereby said frame may be lifted, a plurality of pipe engaging members carried by each of said horizontally disposed members, with the pipe engaging members in each of said horizontally disposed members being aligned with each other for engaging pipe therebetween at spaced intervals therealong whereby it may be lifted, means to rotate said pipe engaging members simultaneously about their vertical axis to pipe engaging position, said interconnecting means between said horizontally disposed members is pivotally mounted on each of said members to accommodate skewing of said horizontally disposed members to change the lateral spacing between said pipe engaging means, and means connecting said paired horizontally disposed members to maintain any desired skewed relationship of said horizontally disposed members.

5. The combination recited in claim 4 wherein said pipe engaging members are provided with arcuate recessed surfaces along each edge to form pipe receiving portions therein.

6. The combination recited in claim 4 including means to support said frame on said plurality of pipe.

7. A device for lifting a plurality of pipe including a frame, said frame including paired horizontally disposed members, means interconnecting said paired members to maintain them in parallel spaced relation, a vertically extending member mounted on each of said horizontally disposed members, means extending between and slidably supported on said vertically extending members whereby said frame may be lifted, a plurality of pipe engaging members carried by each of said horizontally disposed members, with the pipe engaging members in each of said horizontally disposed members being aligned with each other for engaging pipe therebetween at spaced intervals therealong whereby it may be lifted, means to rotate said pipe engaging members simultaneously about their vertical axis to pipe engaging position, said last named means including, a rotatable member carried by each of said vertically extending members, a rod interconnecting each of said pipe engaging members to effect rotation thereof about their vertical axis, means pivotally connecting said rod to said member rotatably carried by said vertically extending members, a rigid extension connecting between said slidably supported member and said rotatable member carried by said vertically extending members whereby vertical movement of said slidably supported member rotates said rotatable member to effect movement of said rod and pipe engaging means connected therewith, said interconnecting means between said horizontally disposed members is pivotally mounted on each of said members to accommodate skewing of said horizontally disposed members to change the lateral spacing between said pipe engaging means, and means connecting said paired horizontally disposed members to maintain any desired skewed relationship of said horizontally disposed members.

8. The combination recited in claim 7 wherein said rotatable member includes a collar rotatably mounted on each of said vertically extending members adjacent said horizontally disposed members.

9. The combination recited in claim 7 wherein said rotatable member includes an elongated member extending longitudinally through each of said vertically extending members and projecting above the upper end of each of said vertically extending members, and wherein said rigid extension is connected from said slidably supported member to said elongated member which projects above said vertically extending member.

References Cited in the file of this patent

UNITED STATES PATENTS

| | | |
|---|---|---|
| 1,956,231 | Thomas | Apr. 24, 1934 |
| 2,213,718 | Reed et al. | Sept. 3, 1940 |
| 2,403,346 | Deiters | July 2, 1946 |
| 2,902,311 | Reel | Sept. 1, 1959 |

FOREIGN PATENTS

| | | |
|---|---|---|
| 87,666 | Norway | July 9, 1956 |